US005540870A

United States Patent [19]
Quigley

[11] Patent Number: 5,540,870
[45] Date of Patent: Jul. 30, 1996

[54] STRUCTURAL ELEMENT FORMED OF A FIBER REINFORCED THERMOPLASTIC MATERIAL AND METHOD OF MANUFACTURE

[75] Inventor: Peter A. Quigley, Cataumet, Mass.

[73] Assignee: Composite Development Corporation, West Wareham, Mass.

[21] Appl. No.: 418,557

[22] Filed: Apr. 7, 1995

Related U.S. Application Data

[62] Division of Ser. No. 913,594, Jul. 14, 1992, Pat. No. 5,437,899.

[51] Int. Cl.$^6$ .............................. B29B 11/16; B29C 53/12
[52] U.S. Cl. ........................ 264/103; 156/166; 156/196; 264/137; 264/171.13; 264/171.24; 264/171.26; 264/257; 264/295; 425/112
[58] Field of Search ..................................... 264/103, 136, 264/135, 257, 171.13, 171.26, 171.24, 137, 295; 425/112, 111, 516; 156/180, 172, 166, 156, 187, 196

[56] References Cited

U.S. PATENT DOCUMENTS

| | | | |
|---|---|---|---|
| 3,561,493 | 2/1971 | Maillard | 138/141 |
| 3,762,986 | 10/1973 | Bhuta et al. | 161/227 |
| 4,515,737 | 5/1985 | Karino et al. | 156/172 |
| 4,791,965 | 12/1988 | Wynn | 138/146 |
| 4,840,846 | 6/1989 | Ejima et al. | 428/373 |
| 4,883,552 | 11/1989 | O'Connor et al. | 264/103 |
| 4,898,770 | 2/1990 | Dunbar | 264/136 |
| 4,978,360 | 12/1990 | Devanathan | 264/136 |
| 5,004,574 | 4/1991 | Sandt | 264/257 |
| 5,048,441 | 9/1991 | Quigley | 114/90 |
| 5,108,810 | 4/1992 | Williams | 156/393 |
| 5,114,290 | 5/1992 | Moghe | 156/393 |
| 5,127,783 | 7/1992 | Moghe et al. | 156/172 |
| 5,132,070 | 7/1992 | Paul et al. | 264/258 |
| 5,290,904 | 3/1994 | Colvin et al. | 428/68 |
| 5,352,311 | 10/1994 | Quigley | 156/180 |
| 5,437,899 | 8/1995 | Quigley | 428/35.7 |

FOREIGN PATENT DOCUMENTS

| | | |
|---|---|---|
| 0185460A2 | 11/1985 | European Pat. Off. |
| 0177736 | 4/1986 | European Pat. Off. |
| 0402309 | 12/1990 | Germany |
| 55-14247 | 1/1980 | Japan ..................................... 264/103 |
| 56169810 | 6/1980 | Japan |
| 61-132623 | 11/1984 | Japan |

OTHER PUBLICATIONS

Alcoa/Goldsworthy Engineering, "A New Generation of High–Strength, Engineered, Composite Structural Shapes," sales brochure.
European Search Report mailed Jan. 4, 1994.
Goldsworthy Engineering, Inc., "The Shape of Things to Come–Advanced Production Systems for Composites," sales brochure.
Monks, "Two Trends in Composites," *Plastics Technology*, vol. 38, No. 3, 40–45 (1992).
Rose and Rose, *Condensed Chemical Dictionary*, 7th ed., Van Nostrand Reinhold Company, NY, 1966, pp. 684, 759–760.
Saunders, *Organic Polymer Chemistry*, 2nd ed., Chapman & Hall, 1988, p. 203.

(List continued on next page.)

Primary Examiner—Jeffery R. Thurlow
Attorney, Agent, or Firm—Lahive & Cockfield

[57] ABSTRACT

A structural member of fiber reinforced composite material suitable for secondary processing and a method of processing is described. The structural member before secondary processing is typically a multi-ply tube, rod, or sheet formed with an outer sheath of fiber reinforced thermoplastic material having a melting temperature $t_{m1}$ and an inner core material, also fiber reinforced thermoplastic, having a melting temperature, $t_{m2}$ lower than $t_{m1}$. The member, prior to secondary processing, is thermoplastic. In a secondary process the member is heated to a temperature between $t_{m1}$ and $t_{m2}$, but sufficient to render the outer sheath malleable. The member is deformed to a desired geometry, such as a helix, and cooled to a hardened state.

10 Claims, 2 Drawing Sheets

OTHER PUBLICATIONS

TPI Data Sheets, "Pultrusion Sets the Pace," Thermoplastics Pultrusions.

TPI TIPS Newsletter, Thermoplastics Pultrusions, Inc., vol. 1, No. 2, Nov. 1991.

TPI TIPS Newsletter, Thermoplastics Pultrusions, Inc., vol. 2, No. 3, May 1992.

TPI TIPS Newsletter, Thermoplastics Pultrusions, Inc., vol. 2, No. 4, Jul. 1992.

TPI TIPS Newsletter, Thermoplastics Pultrusions, Inc., vol. 2, No. 5, Sep. 1992.

STRUCTURAL ELEMENT FORMED OF A FIBER REINFORCED THERMOPLASTIC MATERIAL AND METHOD OF MANUFACTURE

This application is a division of application Ser. No. 07/913,594 filed on Jul. 14, 1992, now U.S. Pat. No. 5,437,899.

BACKGROUND OF THE INVENTION

This invention relates in general to composite structural elements formed of fiber reinforced thermoplastic material and to a method of manufacturing such elements.

The manufacture of structural elements from composite materials formed of high strength fibers embedded in a polymer matrix is well known in the art. Such composite materials have excellent strength to weight characteristics and, accordingly, have found wide application in situations where this characteristic is important. For the most part in the existing art, particular geometrical configurations are fabricated in the same process in which the composite material itself is produced. It is desirable, however, to produce composite structural members in a standardized form, such as elongated hollow tubes of various cross sections and wall thicknesses, and also elongated solid rods, again of varying cross sectional shapes cut to useful lengths or wound on drums as a continuous element. If such standardized structural elements can be produced which can thereafter be further processed to particular shapes for specific applications, such as tapered tubes or rods, or tubes or rods formed into helixes, then the standardized elements can be produced at one location and transported to a different location for processing into the geometric shapes suitable for any particular application and more flexible and economical manufacturing of complex articles can be achieved.

Processes for manufacture of such tubes and rods have been developed in the art. In general, the composite structure is formed of a series of layers or plies, where each ply may be the same or a different polymer and in which the fibers may be wrapped with different orientations or braiding patterns to suit the requirements of a particular structure. The processes employed and the apparatus for practicing these processes are well known to those skilled in the art. They include a pultrusion process, an extrusion process and for sheet like materials a roll forming process. Fiber materials which have been employed in the art include aramid fibers, glass fibers, carbon and graphite, as well as materials such as ceramics and boron. The polymer matrix material is normally a thermoset material such as polyester or epoxy resin. Additionally, a variety of thermoplastic materials such as nylon, polypropylene, polycarbonate and the like have been used.

SUMMARY OF THE INVENTION

It is an object of this invention to provide a structural element of fiber reinforced composite material which is suitable for secondary processing to change its geometric shape and configuration in a secondary processing step. It is another object of this invention to provide a process for the manufacture of standardized shaped materials, which can be subsequently processed for specific applications. With this process the secondary processing for specific applications can be carried out at locations remote from the place of manufacture of the original standardized elements and more flexible and economical manufacture of complex articles can be achieved.

Broadly speaking, the present invention provides a structural element formed of a composite material including fibers embedded in a polymer matrix where the characteristics of the plies or layers, which make up the element, are selected to allow for secondary processing of the element, into any of a wide variety of selected shapes. The structural element produced, before secondary processing, is preferably in a standard structural form (such as a rod, tube, or sheet), and may have a variety of cross sectional and elongate dimensions and will remain stable in size and shape until the secondary processing is carried out. A standardized element may also, conveniently, be wound on a creel. In order to provide for secondary processing, the structural element is formed of a thermoplastic material, or a thermoset material cured to the "B" condition, such that it will be deformable upon the application of appropriate heat.

In particular the structural element is fabricated with an outer sheath, which taken together with an inner core, acts as a mold for composite fiber material in the space therebetween during a secondary processing step in which sufficient heat is applied to the element to melt the material between the core and the sheath while the core and the sheath become deformable, but not fluid. This is achieved by employing a composite material characterized by a matrix melting temperature which is significantly lower than the melting temperature of the materials forming the outer sheath and the inner core. Typically the outer sheath and inner core would be formed of polymer only, but a composite material such as fibers in a higher melting temperature matrix could also be employed.

The present invention also encompasses a method of manufacture of fiber reinforced composite members in a variety of geometric shapes. The process involves the production of a composite material structural element of generally standardized shape, such as elongated tubes, rods, or sheets fabricated in a series of layers or plies, followed by a secondary processing to deform the shape of these standardized elements into particular desired geometries for a final structural element, such as helixes, tapered tubes and rods, elements bent in a variety of curves, and the like. In the process fabrication of the initial standardized shape structural element can be accomplished using substantially conventional techniques for fabricating fiber reinforced composite members, provided that the member so constructed includes an outer sheath having a substantially high melting temperature and an inner material characterized by a much lower melting temperature. The member may have two layers, the outer sheath and an inner core of lower melting temperature material, or it may be formed with three layers, a center core of relatively high melting temperature material; an outer sheath spaced from that center core, also formed of a relatively high melting temperature material, and a material in between which has a substantially lower melting temperature. Both layers, in the two layer construction, or all three layers in the three layer construction, must be reformable during secondary processing, by being a thermoplastic material, or thermoset material which has been cured to the "B" state, rendering it not fully cross linked and reformable upon the application of heat.

In the secondary processing step standardized shape members are treated at a temperature which is higher than the melting temperature of the lowest melting temperature material in the member, below the melting temperature of the outer sheath and inner core, but at a high enough temperature to render the outer sheath and inner core malleable. The desired ultimate shape, such as a helix, can then be produced under these conditions by wrapping the malleable element around a mandrel, or passing it through a mold form to produce the desired final shape. By cooling the processed member in this condition, the reformed member is completed with a desired strength to weight ratio, characteristic of fiber reinforced composite materials.

Modifications to this process may include the arrangement of the fibers in the first step so that the spacing or angle between them can change in the secondary processing to avoid structural weakness at curves, bends and the like.

Suitable materials for the matrix components are principally polymer resins which will penetrate and bond to the fibers and which have appropriate melting temperatures. These include thermoplastic materials such as polyphenylene sulfide, polyether sulfone, polyethylene terephthalate, nylon, polypropylene, polycarbonate and acetal, and thermoset material such as epoxy or polyester resin, catalyzed by anhydride, polyamides or aliphatic amines.

A variety of fibers may be employed, for example, aramid, carbon, graphite, glass, boron and ceramic. One technique know to those familiar with the art involves the use of a low viscosity thermoplastic monomer and catalyst which are mixed just prior to saturation of the weave or unidirectional fibers. The monomer would then in situ polymerize to form the composites thermoplastic matrix material.

DESCRIPTION OF PREFERRED EMBODIMENTS

Figure 1:
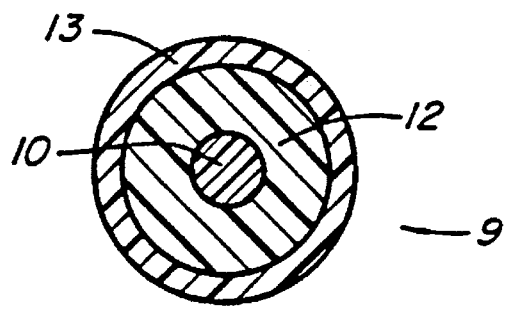
FIG. 1 is an illustration in cross sectional view of one embodiment a composite material member before secondary processing constructed in accordance with the principles of this invention.

With reference to FIG. 1, a cross sectional view of a composite member suitable for secondary processing is shown. The member 9 has a solid core 10, typically formed of a polymer having a melting temperature $t_{m1}$ surrounded concentrically by a second layer 12, preferably of fiber reinforced composite material, having a melting temperature $t_{m2}$ and a concentric outer sheath 13 also typically formed of a polymer having a melting temperature $t_{m3}$. Both the solid core 10 and the outer sheath 13 may also be formed of fiber reinforced material characterized by melting temperatures $t_1$ and $t_3$, respectively. Core 10 may also be a hollow tube, so that the member 9 is a tube with a wall having three layers. Each of the materials making up the layers 10, 12 and 13 are either thermoplastic or thermoset materials cured to the "B" state. Thus, each of the layers may be rendered malleable upon further heating and permanently fixed in shape upon cooling. The materials of these layers are selected such that both $t_{m1}$ and $t_{m3}$ represent higher melting points than $t_{m2}$. In secondary processing, the member is heated to a temperature above the melting point $t_{m2}$, but below the melting points $t_{m1}$ and $t_{m3}$ so that layer 12 is a fluid captured between the core layer 10 and the outer sheath 13. The temperature employed in secondary processing should be high enough to render core 10 and outer sheath 13 malleable so that the entire member may be formed into any of a variety of suitable geometric shapes using mandrels, or bending forms, such as those used in a roll forming process. Typically the member 9 shown in FIG. 1 would, prior to secondary processing, be formed as an elongate standardized piece, such as a tubing. The tubing may come in a selected variety of diameters. It may either be of convenient length, or of very long lengths and wound on a creel in the same manner as a cable is wound. In this form, the basic element may be transported to appropriate sites where the secondary processing can be carried out to produce the desired form. It thus becomes a stock material. Of course, the cross sectional shape need not be circular, it can be any conveniently fabricated useful shape.

Figure 2:
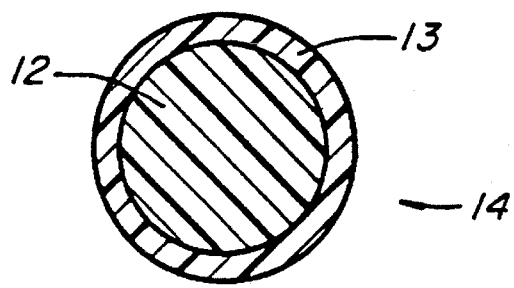
FIG. 2 is an illustration in cross sectional view of a second embodiment of a composite material member constructed in accordance with the principles of this invention.

In FIG. 2 a second embodiment of a structural member 14 in a state of readiness for secondary processing is shown. Member 14 is shown formed with only two layers. Thus the structural element is a rod. There is no center core. Again in this instance the melting temperature of the outer sheath 13, $t_{m3}$ is higher than the melting point $t_{m2}$ of the central composite material 12. In secondary processing the element 14, the temperature is raised above the melting point $t_{m2}$ and above the point at which the sheath 13 material is sufficiently malleable, but below its melting point $t_{m3}$. This standardized element may be formed into any of a variety of suitable shapes with the outer sheath 13 acting as a enclosing wall, very much like a mold, for the enclosed fluid composite material 12.

While specific patterns of fibers are not shown, it will be understood that any of a variety of patterns, from relatively simple arrangements such as circumferentially spaced axial fibers to more complex braids may suitably be employed. Generally axial fibers at 45° angle to the axis have been found useful. Also, the fibers may be positioned such that the orientation of the fibers prior to secondary processing may be quite different from that after secondary processing. In secondary processing the fibers may be allowed to move, to change angular orientation with respect to one another, in order to provide more uniform strength in bends and curves. Such a technique is described in U.S. Pat. No. 5,048,441 assigned to the assignee of this application, which is incorporated herein by reference.

Figure 3:
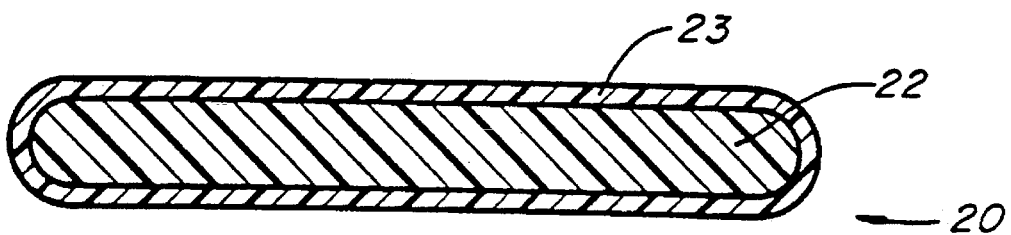
FIG. 3 is an illustration in cross sectional view of still another embodiment of a reinforced composite member constructed in accordance with the principles of this invention.

In FIG. 3 an embodiment of the invention in its presecondary processing form is shown in which the element 20 is a sheet rather than a rod or tube. In this configuration, a sheath 23 of higher melting temperature encloses a core 22 of lower melting temperature. In all respects, other than its geometrical form, the embodiment of FIG. 3 is similar to that of FIG. 2.

Figure 4:
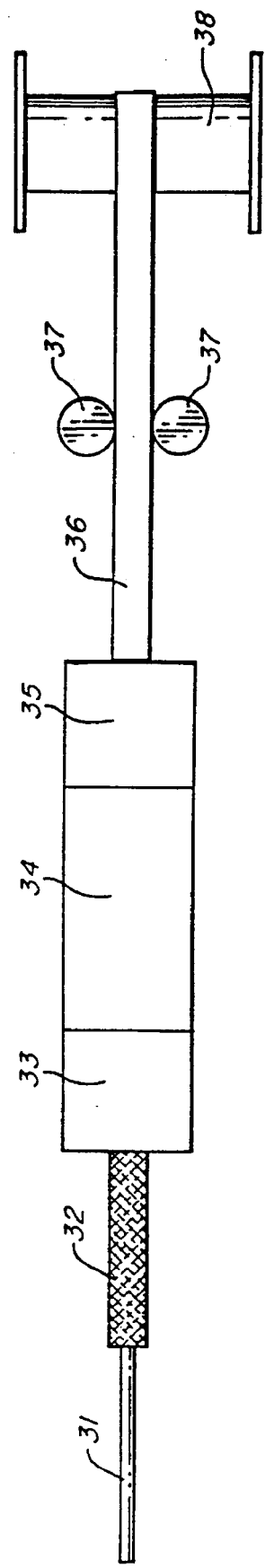
FIG. 4 is an illustration generally in diagrammatic form of a manufacturing method for forming a standardized fiber reinforced composite member in a form suitable for secondary processing.

In FIG. 4 a diagrammatic illustration for a manufacturing technique and process for fabricating a standardized member suitable for secondary processing is shown. Initially, a fiber/thermoplastic preform 31, characterized by a high melting temperature $t_{m1}$ is fabricated. This preform can be formed as a solid, or can be tubular, and can be fabricated from a thermoplastic material, or a thermoplastic matrix composite material. This core 31 is then overwrapped with continuous reinforcing filaments 32. Typical materials for the reinforcing elements are glass, carbon and aramid. The orientation and type of fiber can be selected, depending upon the particular application. A variety of such overwrapped cores are described in U.S. Pat. No. 5,048,441.

In the next step, the overwrapped preform 32, which is in a thermoplastic condition, is impregnated with fluid, low viscosity thermoplastic material, which when solidified or fully polymerized is characterized by a melting temperature lower than melting temperature $t_{m2}$ lower than $t_{m1}$. This impregnating material may also be formed of monomers and suitable additive materials, which when combined will polymerize. This step takes place at stage 33. This composite material may then be extruded through an appropriate die 34, such as a pultrusion die, to produce a suitable standardized geometric form. The composite profile is then allowed to solidify, by cooling or curing.

In stage 35 an exterior ply or sheath consisting of a thermoplastic or a composite with a thermoplastic matrix, in either case characterized by a melting temperature $t_{m3}$ higher than the melting temperature $t_{m2}$ is applied. A suitable mechanism for applying this outer layer is an extrusion process. The solidified, composite, multilayered profile 36 is pulled through the dies by a take-off or pulling mechanism 37, with the resulting rod or tube being either cut to suitable standardized lengths by a saw, (not shown) or creeled on a suitable reel 38.

In the alternative form, the composite material at stages 33 and 34 and at the extruder 35 may be formed with a constant radius of curvature to provide for continuous creeling with very low stress on the produced composite element.

As earlier indicated the standardized member produced by the method of FIG. 4 is suitable for secondary processing into a variety of shapes. In general, this process involves reheating the composite profile produced to a secondary processing temperature $t_s$ which is greater than the melting temperature $t_{m2}$ but less than melting temperature $t_{m1}$. This secondary processing temperature must, however, be sufficiently high to render the core material 31 malleable. With the composite profile in this condition, the geometry can be changed by bending, flaring, twisting, etc. and this changed geometric form will be maintained while the composite profile is being cooled to a temperature which again solidifies the interior material formed by the filament wrapping and subsequent thermoplastic matrix injection.

Structural elements formed in this process have an excellent strength to weight ratio and are useful for a wide variety of applications. For example, a helical spring can be manufactured. To manufacture the helical spring a composite solid or tubular element of the type fabricated in the process illustrated in FIG. 4 can be secondary processed to form a helical spring. A suitable composite element for this purpose can be made by using an interior preform of nylon 66, a low melting temperature interior layer of nylon 6 matrix material, in which are embedded glass, carbon, aramid or hybrid fibers oriented typically at ±45°. The external thermoplastic sheath is suitably formed with a nylon 66 matrix.

The secondary processing can then be accomplished by reheating the composite profile to 450° F., since nylon 6 has a melting temperature approximately 440° F. and nylon 66 has a melting temperature approximately 515° F. Once this temperature has been achieved a pliable composite element, which now has a liquid interior matrix can be wrapped around a helical form to support the composite profile to a desired outer diameter, helix angle etc. While the profile is so constrained it is cooled to below the melting temperature of the interior matrix until the spring has achieved the desired integrity. This process can be performed continuously by utilizing a helical forming dye consisting of a rotating inner threaded shaft to constrain and drive the profile with the desired helix angle and diameter. The threaded shaft is held inside a stationary threaded barrel, where the internal machine grooves match those of the threaded shaft. The barrel should have a cooling zone to solidify the interior matrix and can be lubricated to facilitate the continuous feed of the composite profile stock.

Having described the invention various modifications and variations will occur to those skilled in the art. The invention is defined by the attached claims.

I claim:

1. A method of forming a composite structural member having a specific geometric shape, said method comprising the successive steps of preparing an initial structural member having a hollow sheath formed of a thermoplastic material having a melting temperature $t_{m3}$ and characterized by deformability upon application of heat at a temperature below $t_{m3}$, and a core element disposed within said sheath and formed of a thermoplastic material characterized by a melting temperature $t_{m2}$ substantially lower than said $t_{m3}$, the characteristics of said sheath material and of said core element material being such that upon application of sufficient heat to said member, at a temperature between said $t_{m2}$ and said $t_{m3}$, said core element material becomes fluid, while said sheath material becomes deformable but not fluid, secondary processing said initial structural member by heating it to a temperature between said $t_{m3}$ and said $t_{m2}$, such that said sheath becomes deformable, deforming said structural member into said specific geometric shape, and cooling said deformed structural member to a temperature where both said core element and said sheath are in a solid state.

2. A method in accordance with claim 1 wherein said initial structural member is prepared using a pultrusion process.

3. A method in accordance with claim 1 wherein said sheath is fabricated around said core element using an extrusion process.

4. A method in accordance with claim 1 wherein said specific geometric shape is a helix.

5. A method of forming a composite structural member having a specific geometric shape, said method comprising the successive steps of preparing an initial structural member having a hollow sheath formed of a thermoplastic material having a melting temperature $t_{m3}$ and characterized by deformability upon application of heat at a temperature below said $t_{m3}$, a tubular element disposed within said sheath and formed of a thermoplastic material characterized by a melting temperature $t_{m2}$ substantially lower than said $t_{m3}$, and a core element disposed within said tubular element and formed of a thermoplastic material characterized by a melting temperature $t_{m1}$ higher than said $t_{m2}$, the characteristics of said sheath material, said tubular element material, and said core element material being such that upon application of sufficient heat to said member, at a temperature higher than said $t_{m2}$ and lower than said $t_{m3}$ and said $t_{m1}$, said tubular element material becomes fluid, while said sheath material and said core element material become deformable but not fluid, secondary processing said initial structural member by heating it to a temperature sufficiently higher than $t_{m2}$ such that said sheath and said core element become deformable, deforming said structural member into said specific geometric shape, and cooling said structural member, with said geometric shape, to a temperature where both said core element and said sheath are in a solid state.

6. A method in accordance with claim 5 wherein said tubular element is formed by preparing a fiber braid in a specific pattern, impregnating said braid with a low viscosity thermoplastic monomer and a catalyst which are mixed just prior to impregnation of said braid, thereby forming a thermoplastic fiber reinforced member.

7. A method in accordance with claim 1 wherein said material of said sheath is formed of a polymeric material, and said material of said core element is a polymeric material.

8. A method in accordance with claim 1 wherein said material of said sheath is formed of a polymeric material, and said material of said core element is a composite including first reinforcing fibers and polymeric material.

9. A method in accordance with claim 5 wherein said material of said sheath is a polymeric material, said material of said tubular element is a polymeric material, and said material of said core element is a polymeric material.

10. A method in accordance with claim 5 wherein said material of said sheath is a polymeric material, said material of said tubular element is a composite including reinforcing fibers and polymeric material, and said core element a polymeric material.

* * * * *